United States Patent [19]

Urbas et al.

[11] Patent Number: 5,420,579
[45] Date of Patent: May 30, 1995

[54] ANTENNA AND DRIVING CIRCUIT FOR TRANSMITTING AND RECEIVING SIGNALS TO AND FROM A PASSIVE TRANSPONDER

[75] Inventors: Donald J. Urbas, Evergreen; David Ellwood, Golden, both of Colo.

[73] Assignee: Bio Medic Data Systems, Inc., Maywood, N.J.

[21] Appl. No.: 175,475

[22] Filed: Dec. 28, 1993

Related U.S. Application Data

[63] Continuation of Ser. No. 19,496, Feb. 19, 1993, abandoned, which is a continuation of Ser. No. 605,049, Oct. 29, 1990, Pat. No. 5,250,944.

[51] Int. Cl.$^6$ ............................................. G08C 19/06
[52] U.S. Cl. ........................... 340/870.31; 340/825.54; 343/856
[58] Field of Search ................. 340/870.31, 870.32, 340/825.54; 343/738, 856, 867, 792; 455/41, 82, 263, 273, 274, 279; 324/313, 314, 318, 322

[56] References Cited

U.S. PATENT DOCUMENTS 4,630,044  12/1986  Polzer .
4,730,188   3/1988  Milheiser .
4,996,481   2/1991  Ackerman et al. .

FOREIGN PATENT DOCUMENTS 2034558     11/1978  United Kingdom .
2179525      8/1986  United Kingdom .
WO87/04865   2/1987  WIPO .
WO90/14736  11/1990  WIPO .

OTHER PUBLICATIONS

Cross, A. F., "Time–code Receiver Clock —3", Wireless World, Apr. 1978, pp. 56–58.

Primary Examiner—Michael Horabik
Attorney, Agent, or Firm—Stroock & Stroock & Lavan

[57] ABSTRACT

A system for receiving a signal from a passive transponder includes a probe which transmits an exciter signal having a first frequency and receives a signal from the transponder having a second frequency. The probe includes an antenna for transmitting the exciter signal. The antenna includes a second coil and a primary coil wound about the second coil. The second coil is tuned to resonate at the first frequency. A receiver is provided for driving the primary coil at the first frequency.

2 Claims, 4 Drawing Sheets

ANTENNA AND DRIVING CIRCUIT FOR TRANSMITTING AND RECEIVING SIGNALS TO AND FROM A PASSIVE TRANSPONDER

This is a continuation of application Ser. No. 08/019,496, filed Feb. 19, 1993, now abandoned, which is a continuation application of Ser. No. 07/605,049, filed on Oct. 29, 1990, now U.S. Pat. No. 5,250,944.

BACKGROUND OF THE INVENTION

This invention is directed to a system for receiving signals from a passive transponder and, in particular, to a probe antenna and signal processing circuit for transmitting a signal to the passive transponder and receiving the signal transmitted back by the passive transponder.

Transponder and scanner systems are well known in the art. Systems include an interrogator which receives signals from a passive transponder. Such a prior art system is known from U.S. Pat. No. 4,730,188 and includes an antenna which transmits a 400 KHz signal which is received by the transponder. The transponder receives the input signal and outputs a signal. A single antenna and coil is used to both transmit and receive signals. The interrogator receives a divided signal of 40 KHz and 50 KHz. This signal is coded in accordance with a combination of 40 KHz and 50 KHz portions of the transmitted signal to correspond to information stored in a chip contained within the passive transponder.

The prior art interrogator includes an antenna having a single wire wound about a core forming a coil. The coil is used to both transmit and receive signals. The single wire is coupled directly to a driving circuit for producing the interrogation signal transmitted to the passive transponder.

The prior art interrogators have been satisfactory. However, they suffer from the disadvantage that because the coil is being driven directly by an amplifier, it becomes necessary to include load resistors within the driving circuitry. These resistors tended to overheat providing for an inefficient driving system which requires a high voltage input and provides low current output.

The coupling between the interrogator and transponder is through magnetic coupling. It follows that the greater the amperage within the interrogator, the stronger the transmitted magnetic field. The prior art device suffered from the disadvantage that even though high voltage was used a low current resulted reducing the magnetic field generated, thereby reducing the transponder read distance. Additionally, the transponder actually outputs a signal at a return frequency which is close to the excitement frequency. The return frequency which is closest to the excitement frequency will be the signal which is highest powered, i.e. has the greatest amplitude. However, because the prior art antennas utilize a single coil they are required to use the lesser frequency return signal of 40 KHz and 50 KHz because the higher frequency return signal and transmitted signal frequency interfere with each other (due to its proximity to the transmitted signal frequency). The 40 KHz/50 KHz signal is transmitted at a lower power thereby reducing read distances. Additionally, because the interrogator operates at 40 KHz, it is subject to background noise interference from television monitoring screens or computer CRTs which by necessity are normally present since they are used in conjunction with microprocessors which are used during scanning. These monitors also operate utilizing a 40 KHz and 50 KHz RF signal. Because these monitors have a high power output relative to the antennas, they interfere with the operation of the interrogator when the interrogator is used in proximity to computers and other various monitors.

Therefore, an efficient system capable of transmitting a signal at one frequency and receiving a signal having a return frequency close to the transmit signal frequency is provided by the instant invention.

SUMMARY OF THE INVENTION

Generally speaking, in accordance with the instant invention, a probe interrogator for use with a passive transponder, capable of transmitting a signal at one frequency and receiving the return signal at a frequency close to the transmitted frequency is provided. The probe includes a receive antenna for receiving the signal output by the transponder. The antenna includes a ferrite rod having a single wire forming coils at each end of the rod, the coils being wound in directions opposite to each other to provide a null point on the ferrite rod. A transmit coil is mounted about the ferrite rod at the null point of the antenna.

In one embodiment, the transmit antenna is formed of a primary coil which receives an excitement signal. A secondary coil is magnetically coupled to the primary coil. The primary coil is wound about the secondary coil in a substantially 1 to 17 ratio.

In yet another embodiment, the primary coil is excited by a one quarter duty cycle square wave at a desired frequency. The secondary winding coil is coupled to an exciter Secondary tuning circuit which is tuned to the frequency of the exciter signal allowing the secondary coil to resonate at the exciter frequency signal to produce the remaining three quarters of the exciter signal.

In another embodiment, the receive coil is coupled to a receive coil tuning circuit causing the receive coil to resonate at a desired frequency. The received signal is mixed with a signal at the frequency of the excitement signal to mix down the frequency of the received signal to a signal upon which a phase locked loop may better operate.

Accordingly, it is an object of the invention to provide an improved system for the reception of signals from a passive transponder.

Another object of the invention is to provide an antenna which both transmits and receives signals capable of receiving a signal having a frequency substantially equal to the frequency of the transmitted signal.

Yet another object of the invention is to provide a transmit antenna capable of producing a high magnetic field utilizing a low power source.

A further object of the invention to provide a probe capable of receiving a signal substantially centered at 455 KHz.

Still another object of the invention is to provide an antenna using separate exciter and receiver coils so that each respective antenna coil is most efficient at their respective frequencies.

Yet another object of the invention is to provide a receive antenna with increased signal to noise ratio.

A further object of the invention is to provide a system for receiving a signal from a passive transponder which is able to make use of wide bandwidth high Q filters such as ceramic filters.

A further object of the invention is to provide a system for receiving signals from a passive transponder which has greater immunity to electro-magnetic noise from heavy machinery and electronic equipment.

Still other objects and advantages of the invention will in part be obvious and will in part be apparent from the specification.

The invention accordingly comprises the features of construction, combination of elements, and arrangement of parts which will be exemplified in the constructions hereinafter set forth and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
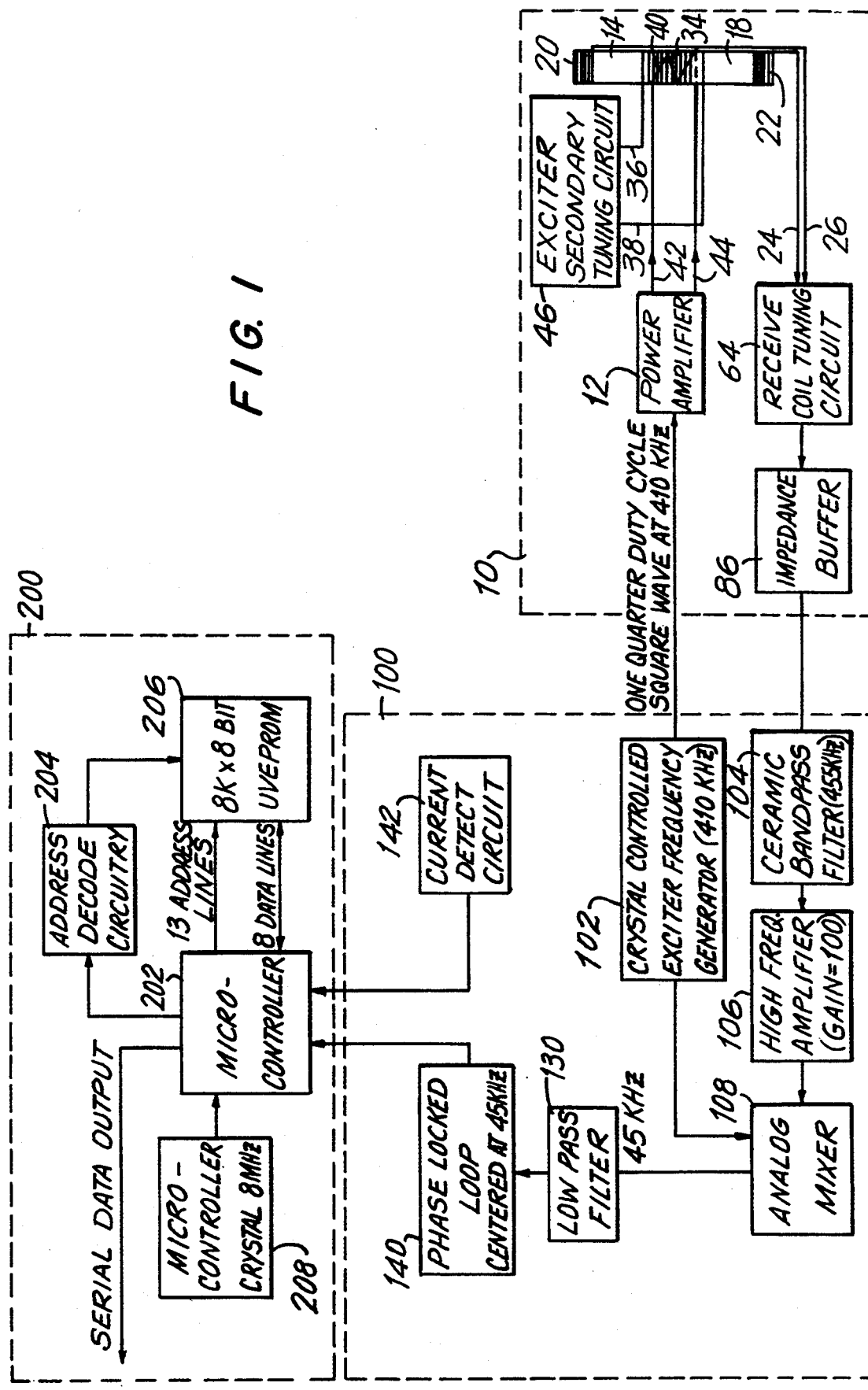
FIG. 1 is a block diagram of a system for receiving a signal from a passive transponder constructed in accordance with the invention.

Reference is first made to FIG. 1 wherein a block diagram of the system for receiving signals from a passive transponder constructed in accordance with the invention is provided. The system includes a receiver 100 which provides an excitement signal having a predetermined frequency to a probe 10. The excitement frequency is 410 KHz. Probe 10 outputs the 410 KHz signal to a transponder (not shown). In an exemplary embodiment, probe 10 communicates with the transponder through inductive coupling known in the art from U.S. Pat. No. 4,730,188, which patent is incorporated herein by reference as if fully set forth herein. The return data stream output by the transponder is output on a higher frequency carrier signal substantially centered about 455 KHz. The signal is encoded to have 451 KHz portions and 461.25 KHz portions.

This received signal is input to receiver 100 which mixes the signal with the 410 KHz excitation frequency to produce a lower frequency signal centered 45 KHz. The 45 KHz signal is then converted to a data stream of Manchester encoded data. A receiver interface 200 receives the data stream and converts the data stream to an ASCII data output useable by most computers.

A more detailed description of the invention is now provided. Receiver 100 includes a crystal controlled exciter frequency generator 102. Crystal controlled exciter frequency generator 102 outputs an exciter signal of 410 KHz for exciting the transponder to a power amplifier 12 of probe 10. Power amplifier 12 amplifies the exciter-signal and outputs the amplified exciter signal to an antenna 14.

Figure 2:
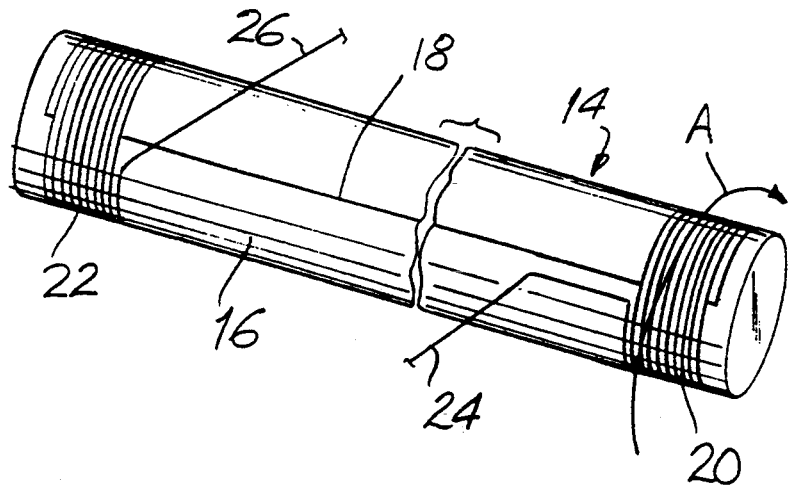
FIG. 2 is a perspective view of the receive portion of an antenna constructed in accordance with the invention.
Figure 3:
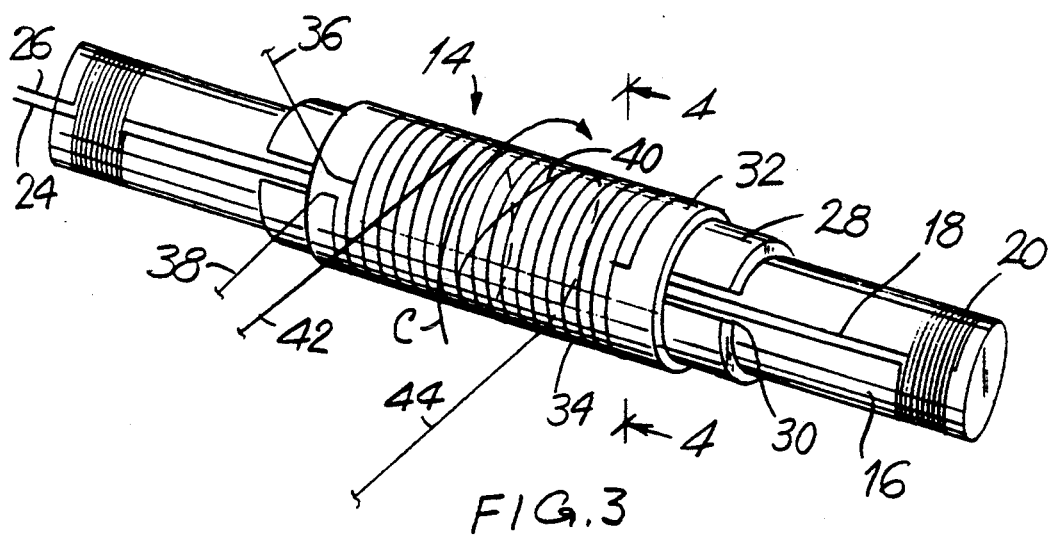
FIG. 3 is a perspective view of the receive and transmit portion of the antenna constructed in accordance with the invention.
Figure 4:
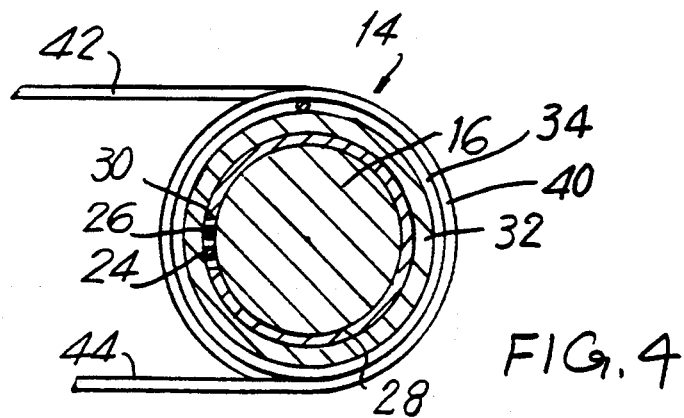
FIG. 4 is a sectional view taken along line 4—4 of FIG. 3.

Reference is now made to FIGS. 2-4 wherein antenna 14 is shown in detail. Antenna 14 acts as both the transmit antenna and receive antenna. The receiving structure of antenna 14 includes a ferrite rod 16. A single wire 18 is wound about each end of ferrite rod 16. Wire 18 forms a first coil 20 wound in the direction of arrow A extending from the end of ferrite rod 16 towards the center of ferrite rod 16. Wire 18 also is wound in the direction of arrow A at the opposite end of ferrite rod 16 from the end towards the center to form a second coil 22. One end 24 of wire 18 extends towards the center of ferrite rod 16 from coil 20 while a second end 26 of wire 18 extends towards the center of ferrite rod 16 from coil 22. Even though both coils 20 and 22 are wound in the direction of arrow A, they extend in opposite directions towards each other which in effect provides opposite polarities in relation to a magnetic field.

Reference is now made to FIGS. 3 and 4 to more particularly describe the transmit coils of antenna 14. A cardboard inner tube 28 having a slit 30 formed therein is disposed about ferrite rod 16 to expose the portion of wire 18 extending between coil 20 and coil 22. A second cardboard tube 32 is slideably disposed about cardboard inner tube 28. A secondary coil 34 is formed of a single wire wrapped about cardboard tube 32 in the direction of arrow C. The wire of coil 34 forms coil ends 36, 38 extending away from secondary coil 34. Secondary coil 34 may be covered with a layer of electrical tape to maintain secondary coil 34 in place. A primary coil 40 is wound about secondary coil 34 in the direction of arrow C and has coil ends 42, 44. Primary coil 40 has a number of windings about ferrite rod 16 which is substantially less than the number of windings of secondary coil 34 about ferrite rod 16 forming a two stage step up inducer.

Coils 20, 22 are substantially equidistant from the center of ferrite rod 16. Due to their opposite winding directions, one coil nullifies the magnetic field effects of the other. Specifically, coil 22 will receive the positive field of the waveform while coil 20 will see the negative polarity of the waveform relative to each other so that they null each other out. This nulls the field induced by the exciter coil formed by coils 34, 40. Cardboard coil tube 32 is slidable relative to the null point produced by coils 20, 22 along ferrite rod 16 so that prior to completion of manufacture, the antenna may be perfectly tuned to the null point so that the receiving portion of antenna 14 better nullifies the field induced by exciter coils 34, 40. While the transmit signal is nullified due to the effect of coils 20, 22 the received signal from the transponder is not nullified because the source of the received signal will rarely be equidistant from both receive coils 20, 22 so that there will be a stronger received signal in one coil than the other preventing mutual cancellation.

In an exemplary embodiment, the ratio of turns of primary coil 40 to secondary coil 34 is about 1 to 17. Secondary coil 34 is formed of 17 and ¼ turns while the overlying primary coil 40 is formed as 1 and ⅛ turns. Receiving coils 20, 22 are each formed of 30 gauge magnet wire wrapped 20 times about each end of ferrite rod 16. Each coil is disposed 0.06 inches from the respective end of ferrite rod 16 and each coil 20, 22 does not extend beyond 0.31 inches from the respective end of ferrite rod 16. Primary coil 40 and secondary coil 34 are formed of litz wire.

As seen in FIG. 1 power amplifier 12 provides an input to coil ends 42, 44 of primary coil 40. Coil ends 36, 38 of secondary coil 34 are coupled to an exciter secondary tuning circuit 46. Secondary tuning circuit 46 controls the frequency at which secondary coil 34 resonates. Secondary coil 34 is tuned by exciter secondary tuning circuit 46 to resonate at the same frequency as the exciter signal output by primary coil 40. This results in an inductive coupling for a transmit antenna having a very high Q.

Figure 5:
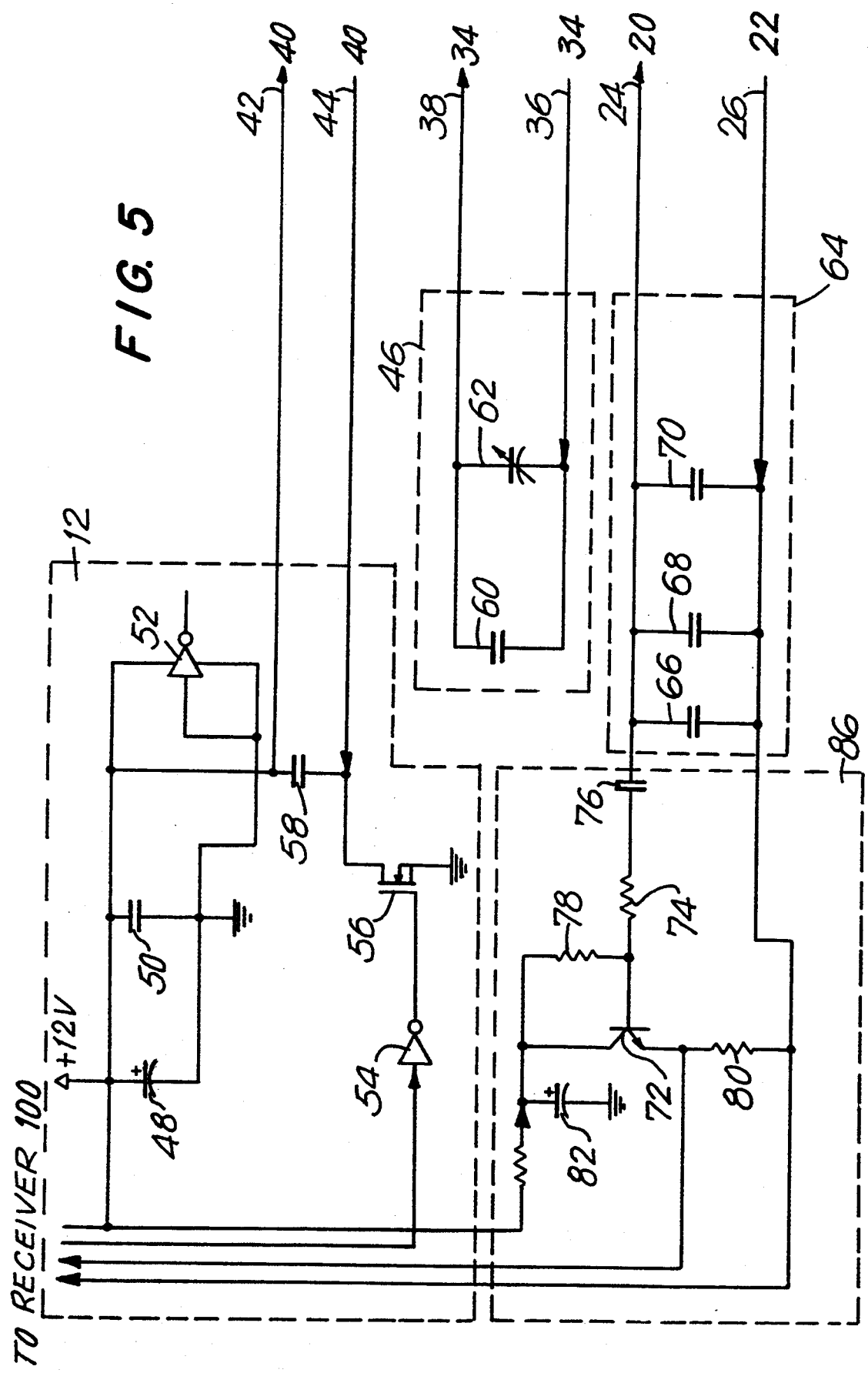
FIG. 5 is a circuit diagram of the probe constructed in accordance with the invention.

Reference is now made to FIG. 5 wherein the circuitry for exciter secondary tuning circuit 46 and power amplifier 12 are shown in detail. Power amplifier 12 includes a capacitor 48 coupled in series between the junction of a twelve volt power source and the 410 KHz signal output by crystal controller exciter frequency generator 102 and ground. A second capacitor 50 is coupled in parallel with capacitor 48. An inverting amplifier 52 is coupled to ground. A second inverting amplifier 54 receives the 410 KHz signal from crystal controlled exciter frequency generator 102 as an input and provides an output to the base of a transistor 56 coupled to ground and one side of the capacitor 58. Capacitor 58 is coupled across coil ends 42, 44 providing an amplified 410 KHz excitation signal.

Exciter secondary tuning circuit includes a first capacitor 60 coupled in parallel with a variable capacitor 62 across coil ends 36, 38 of secondary coil 34. By coupling secondary coil 34 to exciter secondary tuning circuit 46, secondary coil 34 becomes tuned to the excitation signal frequency of 410 KHz. Accordingly, the resonant frequency of secondary coil 34 becomes 410 KHz. By closely tuning the resonant frequency of secondary coil 34 to the output frequency of primary coil 40, a tightly tuned secondary coil 34 functioning as an exciter coil with high Q is provided. This results in an energy saving highly efficient magnetic field transmitter.

Because secondary coil 34 is tuned so tightly, resulting in high Q, secondary coil 34 has a natural resonance at 410 KHz. Accordingly, primary coil 40 need only be driven by a ¼ duty cycle pulse wave at 410 KHz allowing the resonance within secondary coil 34 to freely resonate for the three remaining quarters of the cycle thereby providing a full cycle exciter signal. Accordingly, crystal controlled exciter frequency generator 102 need not drive antenna 14 constantly, but rather pulses antenna 14 one quarter of the time. Additionally, by using the natural properties of a high Q circuit a very large current may be sustained in secondary coil 34 utilizing a primary coil 40 driven by a low power source. As the amperage increases, a stronger magnetic field is produced by antenna 14 increasing the range over which magnetic coupling may occur between probe 10 and the transponder.

By providing a variable capacitor 62 within exciter secondary tuning circuit 46, it becomes possible merely by turning an adjustment to tune secondary coil 34 to a desired resonance frequency, thereby ensuring that the highest Q is obtained for the inductive coupling between coils 34, 40. Additionally, by using an exciter secondary tuning circuit in cooperation with a two coil transmit antenna, a low voltage high current device results increasing the overall efficiency and scan range of the transmit antenna. By using a low voltage high current device, it enables the use of variable tuning capacitors for tuning the secondary coil.

The 410 KHz signal is received by a transponder, which in response to the exciter signal outputs an identification signal having 451 KHz portions and 461.25 KHz portions. The transponder signal is received by receive coils 20, 22. Receive coils 20, 22 of antenna 14 are coupled to a receive coil tuning circuit 64. Receive coil tuning circuit 64 tunes receive coils 20, 22 to resonate at a center frequency of 455 KHz producing a tuned receive antenna with 10 KHz bandwidth so that the shifted receive signal will be received at a higher voltage level than the surrounding signal. Receive coils 20 and 22 produce a received signal. As seen in FIG. 5, coil ends 24, 26 of receiving coils 20, 22 are coupled to a series of capacitors 66, 68 and 70 coupled in parallel across coil ends 24, 26. The base of a transistor 72 is coupled in series with a resistor 74 and a fourth capacitor 76. A second resistor 78 is coupled between the collector of transistor 72 and the base of transistor 72. A third resistor 80 is coupled across two inputs to receiver 100 as well as being coupled to the emitter of transistor 72 at one end. A capacitor 82 is coupled to receiver 100 through a resistor 84 at one end and to ground at its other. In effect, the tuned output of receive coil tuning circuit 64 is passed through an impedance buffer 86 which allows the received signal on the receive coils 20, 22 to be sensed without spoiling the Q of the receive coils 20, 22. The resulting signal is input to receiver 100.

Receiver 100 includes a band pass filter 104 having a substantially 15 KHz bandwidth. By utilizing a 455 KHz signal as the received signal upon which operations are to be performed, not only is the signal received a more powerful one, but it allows the use of off the shelf ceramic band pass filters, thus simplifying the construction of receiver 100 as well as making possible the use of filters having nearly ideal filter characteristics. Band pass filter 104 removes substantially all noise from the received signal. For example, even though the transmit coils are at the field nullifying position on antenna 14, some 410 KHz signal is received by receiving coils 20, 22. This noise and the like is removed by ceramic band pass filter 104. The filtered signal having a centered frequency of 455 KHz is then input to high frequency amplifier 106 providing a gain of 40 dB. The amplified signal is then input to an analog mixer 108 which also receives the 410 KHz signal produced by crystal controlled exciter frequency generator 102 and in response thereto outputs a signal having a frequency which is mixed down to a signal centered at 45 KHz.

Figure 6:
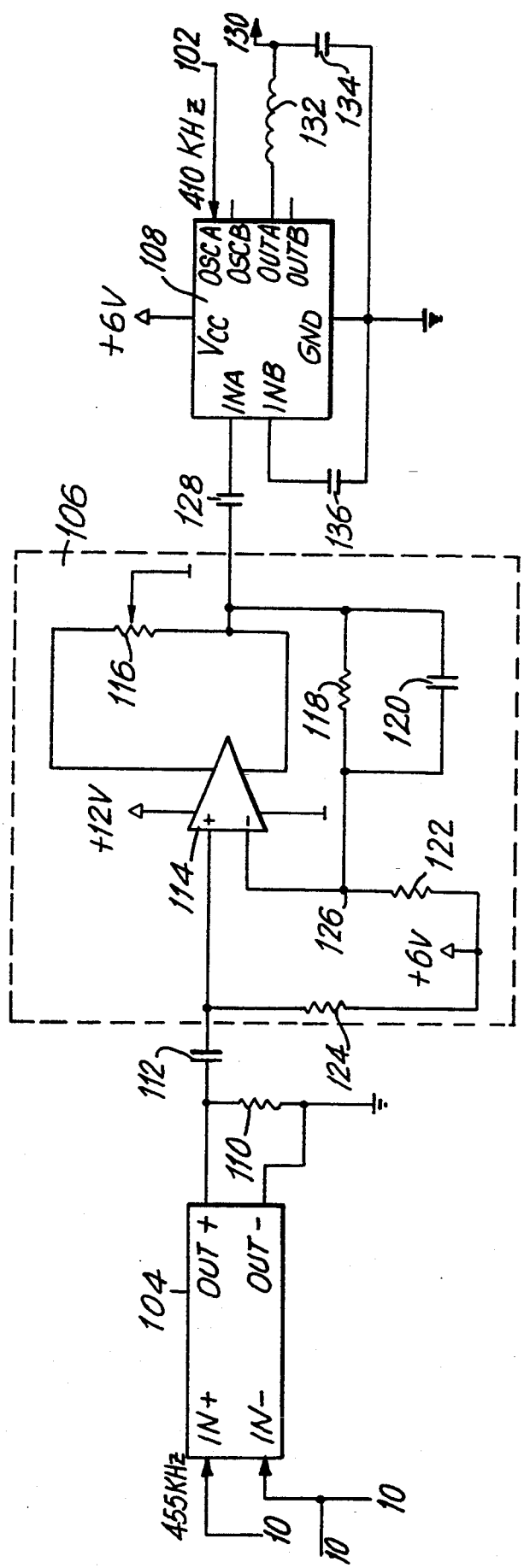
FIG. 6 is a circuit diagram of the band pass filter and mixer of the receiver constructed in accordance with the invention.

Reference is now made to FIG. 6 in which a circuit diagram of ceramic band pass filter 104, high frequency amplifier 106, and analog mixer 108 is provided. The 455 KHz signal is input to the positive input of ceramic band pass filter 104. The negative input of ceramic band pass filter 104 is grounded. The negative output ceramic band pass filter is also grounded. A filtered output is produced at the positive output of ceramic band pass filter 104. A resistor 110 is coupled across the outputs of ceramic band pass filter 104. A capacitor 112 couples ceramic band pass filter 104 to high frequency amplifier 106.

High frequency amplifier 106 includes an operational amplifier 114 coupled between ground and a 12 volt power source. Additionally, a variable resistor 116 also coupled to ground is coupled to operation amplifier 114. The output of operational amplifier 114 is output through a resistor 118 and a capacitor 120 coupled across resistor 118. The junction of capacitor 120 and resistor 118 is coupled to a resistor 122 which in turn is coupled to a six volt power source in series with a resistor 124 which receives the output of capacitor 112. The output of capacitor 112 is input as a positive input to operational amplifier 114. The fed back signal from operational amplifier 114 processed through junction 126 of resistor 118, capacitor 120 and resistor 122 is input as the negative input of operation amplifier 114 so that a high frequency amplified output is output by operational amplifier 114.

Analog mixer 108 receives the output of amplifier 106 through a capacitor 128 and at the same time receives as an oscillator input A the 410 KHz signal of crystal controlled exciter frequency generator 102. Analog mixer 108 takes the difference between the amplified 455 KHz signal and the 410 KHz signal and provides an output at output A of an analog mixer 108. The output signal, in this example centered at 45 KHz, is output to a low pass filter 130. An LC circuit consists of an inductor 132 coupled to output A and disposed in series with a capacitor 134 to ground. A second capacitor 136 is coupled between mixer 108 and ground.

By mixing down the frequency of the received data signal, receiver 100 is better able to operate on the signal. Prior to the mixing down of the frequency, the data was encoded by signal portions 4 to 6 KHz shifted from a signal centered about 455 KHz. Such a shift is about 1%. However, analog mixer 108 produces a signal centered about 45 KHz which still has portions shifted about 5 KHz to indicate encoding of data. The detected shift now becomes 10% of the signal frequency, a quantum difference which is easier to detect as well as perform operation thereon.

Low pass filter 130 receives the lower frequency signal and outputs a noise reduced 45 KHz signal to a phase locked loop circuit 140 which detects a signal centered at 45 KHz. Phase locked loop 140 receives a 45 KHz signal and outputs a Manchester encoded data stream corresponding to the received signal received at antenna 14.

The data stream is output to a receiver interface 200. Receiver interface 200 includes a micro-controller 202 which receives the Manchester encoded data stream as well as a signal from a current detector circuit 142 which detects the level of current being output to the primary winding coil 140. Upon receipt of the data stream, micro-controller 202 accesses the Manchester decoding algorithm stored in EPROM 206 using an address decode circuitry 204. Micro-computer 202 uses the algorithm stored in EPROM 206 to decode the data stream. A micro-controller crystal having an 8 MHz clock 208 provides a clock for micro-controller 202. Once the appropriate instructions have been received from EPROM 206, micro-controller 202 converts the Manchester encoded data into machine useable ASCII code.

By providing an antenna which provides a null point for a transmitted signal on the antenna, it becomes possible to receive a transponder signal which is very close to the transmitted signal, which is the signal of greatest power, thus increasing the probe reading distance. By providing a transmit portion of the antenna comprised of two coils, one of which is tuned to the transmit frequency of the other, it becomes possible to conserve energy by utilizing the resonance within the coils to transmit a portion of the exciter signal thus reducing the time necessary for driving the transmit coil through the use of an exciter frequency generator. By providing two coils in the transmit antenna, in which a primary coil includes a number of turns which is a substantial fraction of the number of turns of the secondary coil, a low voltage high current transmitter is provided.

By providing a probe which may receive high frequency signals, it becomes possible to utilize ceramic band pass filters in the receiver. Additionally, by providing an analog mixer in the receiver, it becomes possible to receive the high frequency and mix down the signal to a lower frequency rather than receiving the lower frequency harmonic of the high frequency signal, thus improving overall system efficiency.

It will thus be seen that the objects set forth above, among those made apparent from the preceding description, are efficiently attained and, since certain changes may be made in the above construction without departing from the spirit and the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A system for transmitting an exciter signal to a passive transponder and receiving a transponder signal, said system comprising receiving means for generating an exciter signal, probe means for transmitting said exciter signal to a passive transponder, said exciter signal having a first frequency, said probe means being adapted to receive said transponder signal from a transponder, said transponder signal having a second frequency, said probe means including an antenna means for transmitting said exciter signal, said antenna means including a secondary coil, secondary coil tuning means coupled to said secondary coil for maintaining said secondary coil tuned to said first frequency, a primary coil wound about said secondary coil and inductively coupled therewith, said secondary coil being tuned to resonate at said first frequency, said receiver means including coil driving means for applying said exciter signal to said primary coil so that said secondary coil resonates at said first frequency of said exciter signal to transmit said exciter signal, said exciter signal having a cycle, said primary coil driving means outputting a portion of a cycle wave at said first frequency causing said primary coil to generate a portion of a cycle of said exciter signal and said secondary coil to generate the entire cycle of said exciter signal.

2. The system for receiving a signal from a passive transponder of claim 1, wherein said secondary coil tuning means includes variable capacitor means coupled to said secondary coil for adjusting the frequency at which said secondary coil resonates.

* * * * *